Sept. 9, 1930. J. JESSEN ET AL 1,775,432
FLUTING AND FORMING MACHINE
Filed July 21, 1928 8 Sheets-Sheet 7
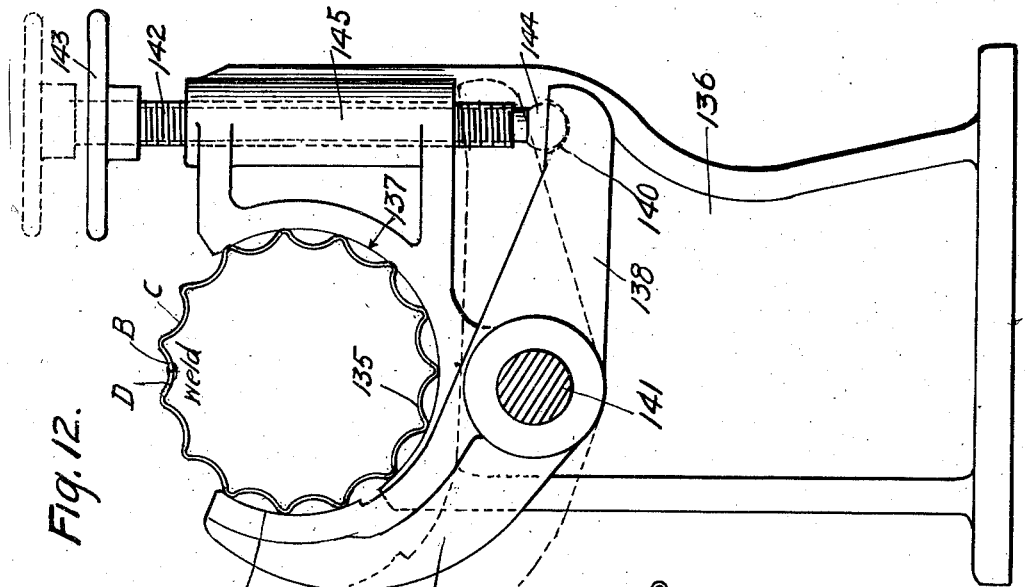
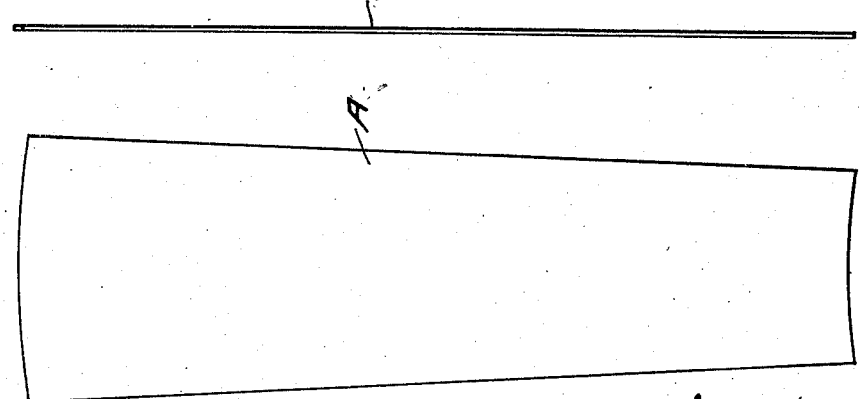
Inventors.
James Jessen.
James P. Marrin.
By Paul, Paul + Moore
ATTORNEYS Patented Sept. 9, 1930

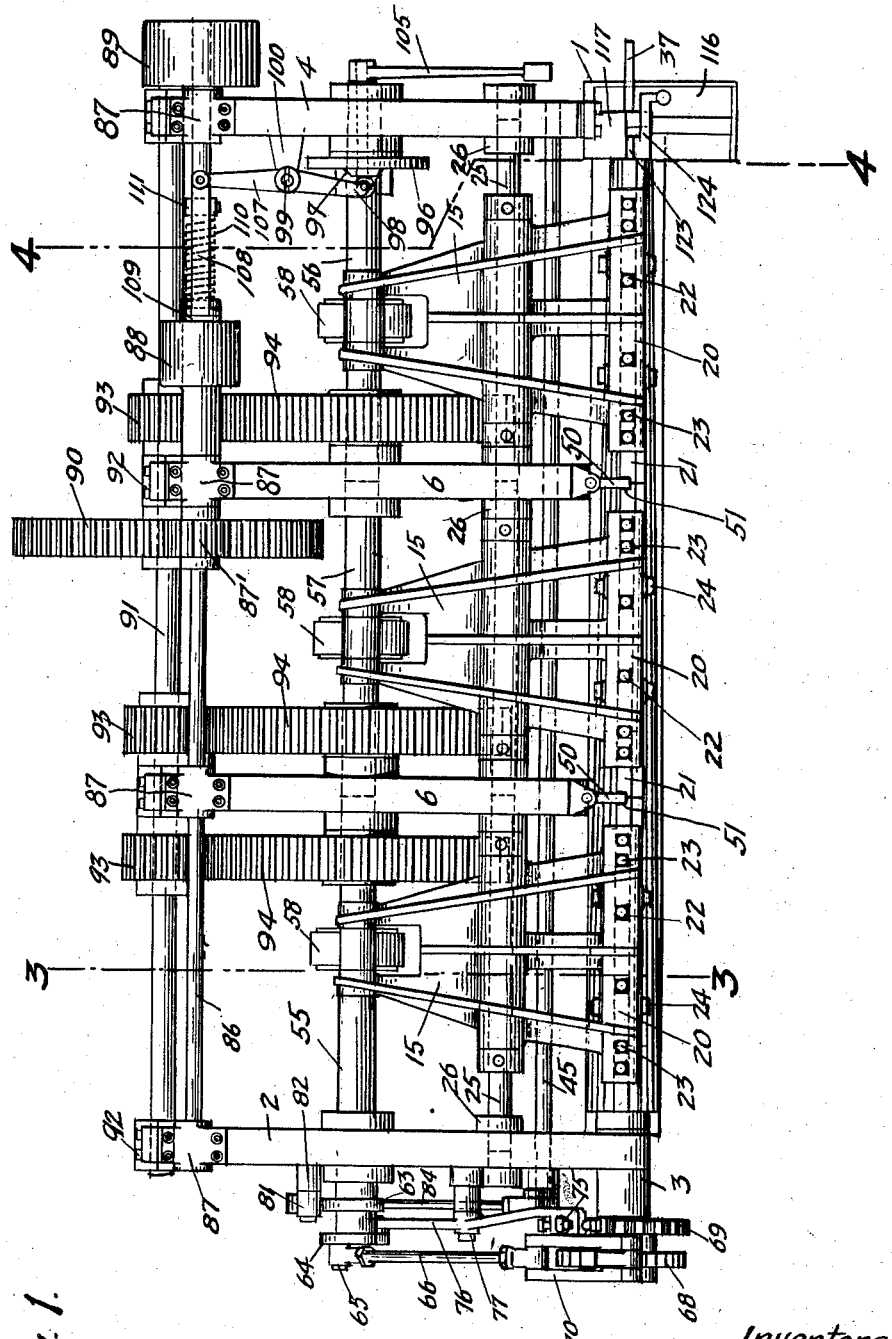

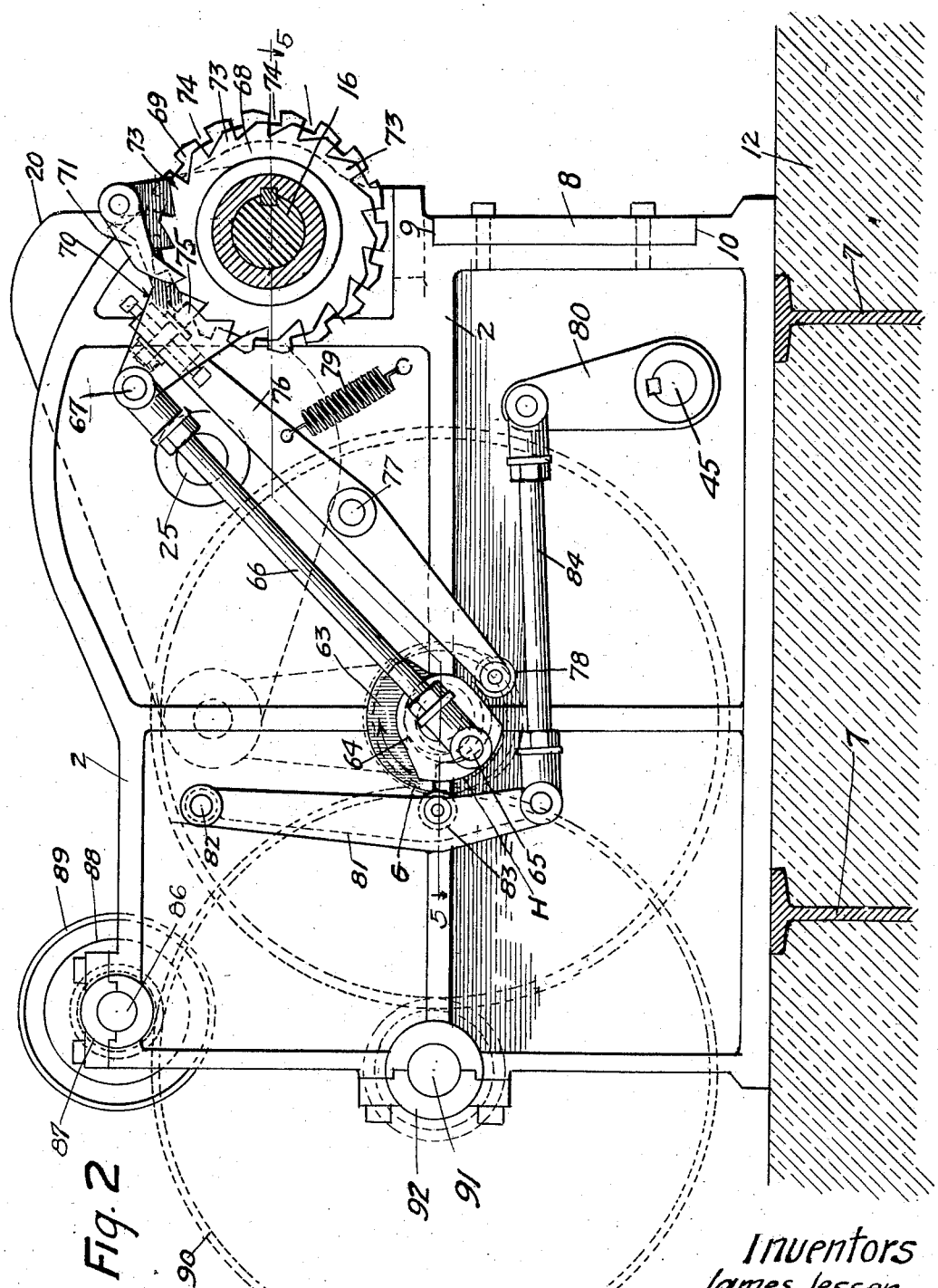

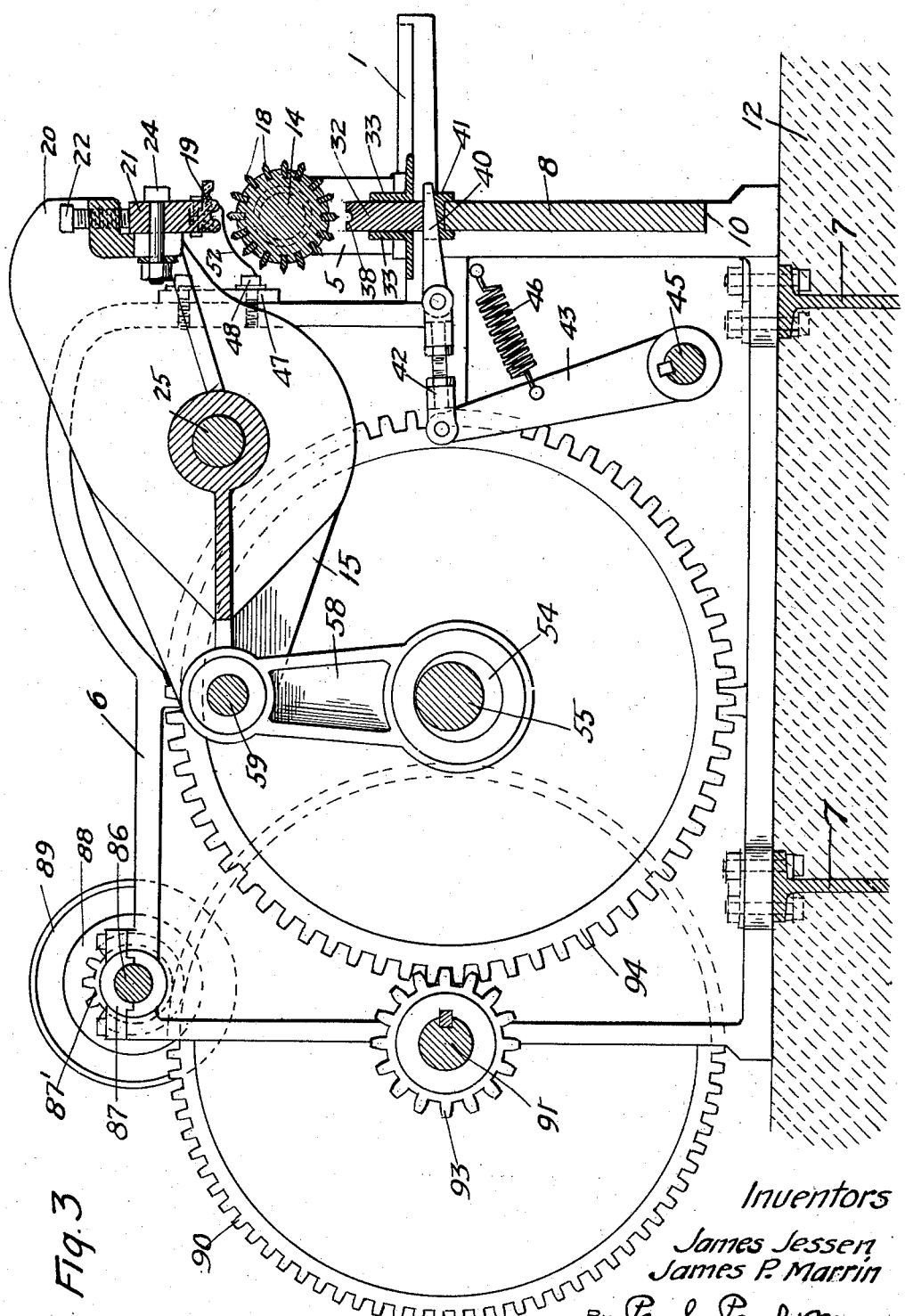

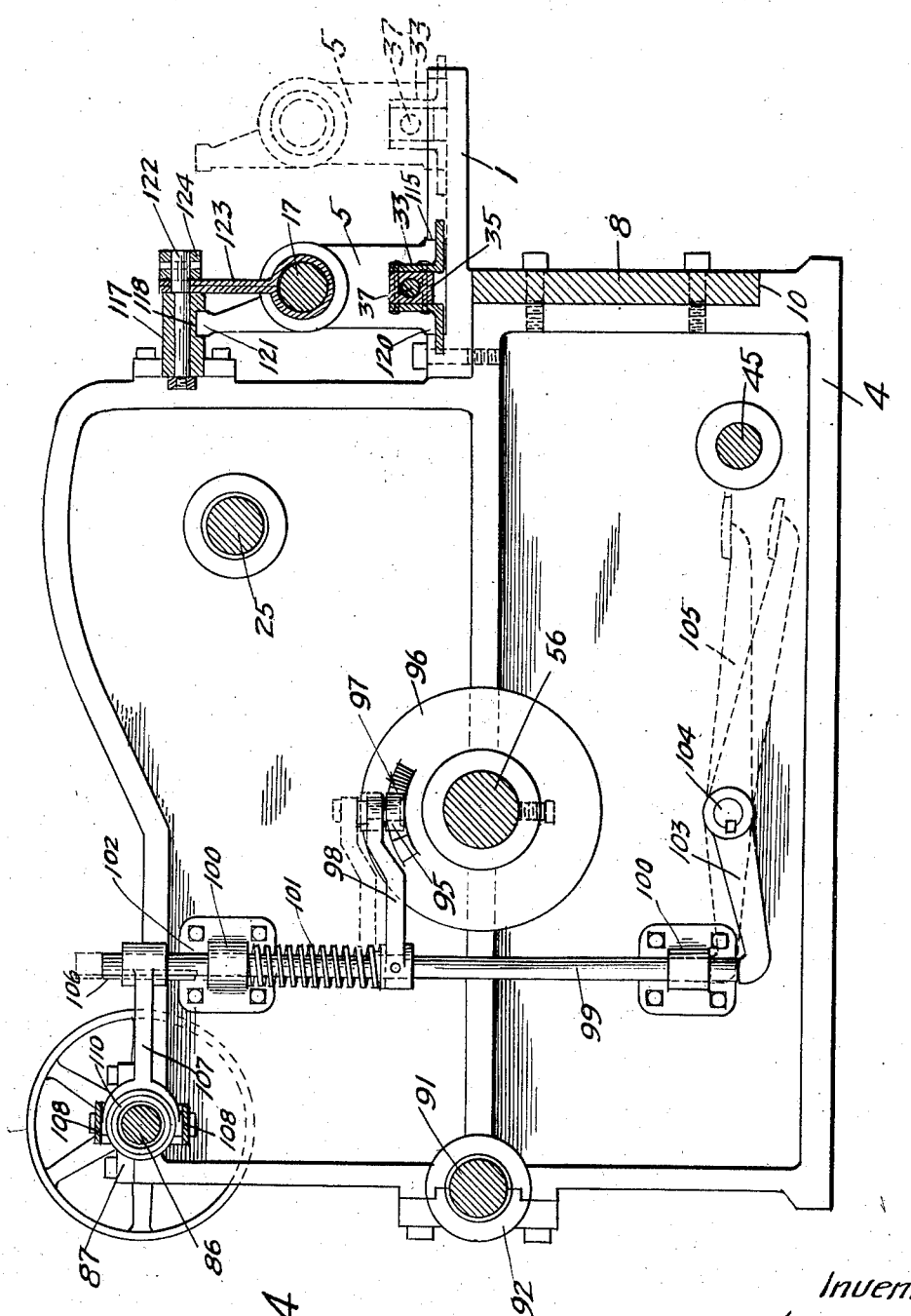

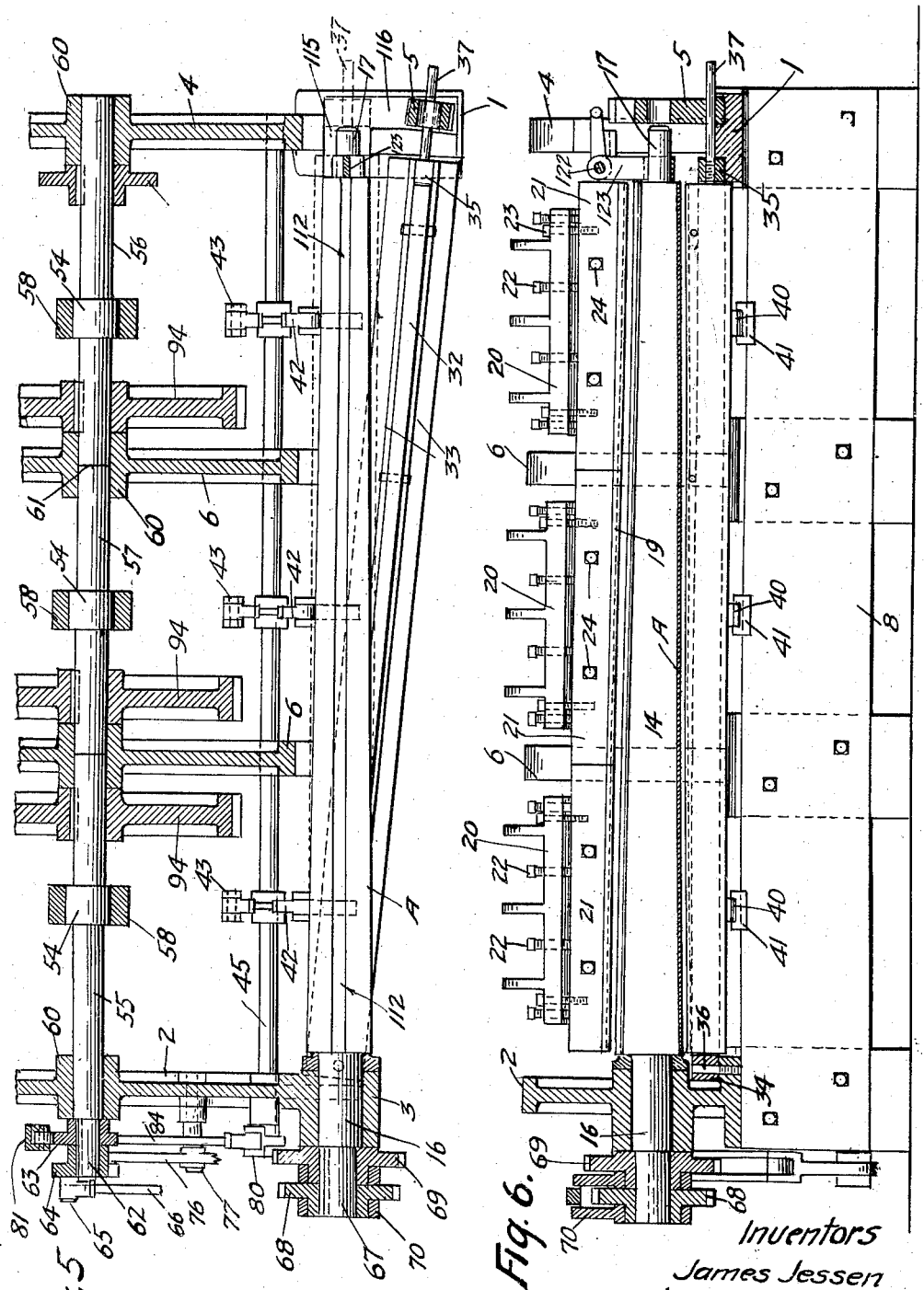

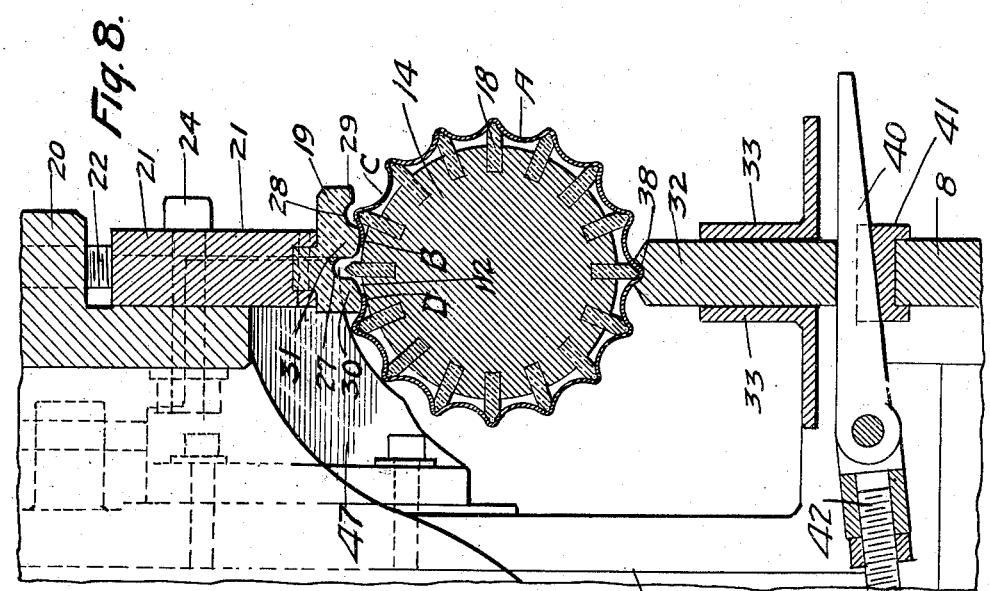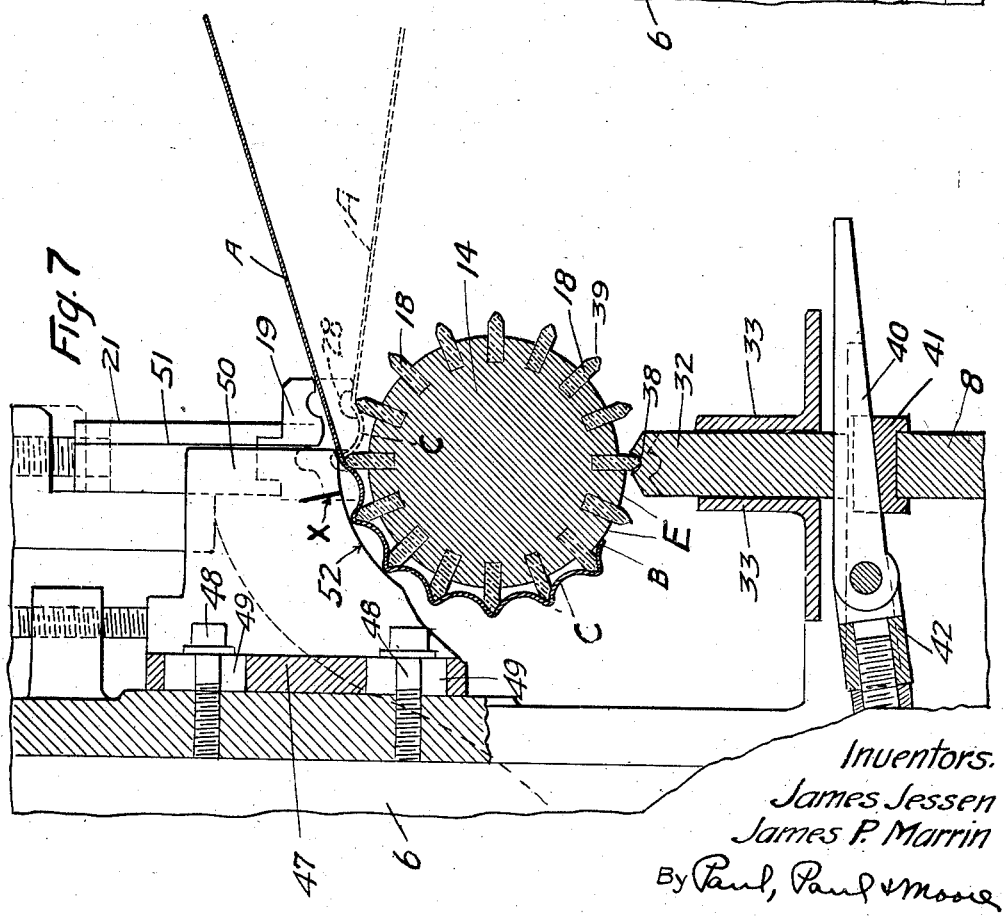

1,775,432

UNITED STATES PATENT OFFICE

JAMES JESSEN AND JAMES P. MARRIN, OF MINNEAPOLIS, MINNESOTA, ASSIGNORS TO THE MARRIN FOUNDRY, INC., OF MINNEAPOLIS, MINNESOTA, A CORPORATION OF MINNESOTA

FLUTING AND FORMING MACHINE

Application filed July 21, 1928. Serial No. 294,333.

Our invention relates to machines for forming indented or fluted columns of flexible or malleable sheet-like material, such as steel, bronze, copper, zinc, etc.

The main object of the invention is to produce a machine to which the material for the columns is introduced in sheet form and which will thereafter simultaneously and automatically press the desired flutes in the metal and form it into the shape of a column or post.

A further object is to produce a machine of this class, that will be rapid in operation, simple in construction and cheap of manufacture, and which may be readily adjusted to produce different sizes and forms of columns or posts.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a plan view of a machine embodying our invention;

Figure 2 is an end elevation of the machine shown on a larger scale;

Figure 3 is a vertical transverse sectional view on the line 3—3 of Fig. 1;

Figure 4 is a similar section on the line 4—4 of Fig. 1;

Figure 5 is a horizontal sectional view on the line 5—5 of Fig. 2;

Figure 6 is a front elevation of Fig. 1;

Figure 7 is a cross-sectional view showing the relation between the forming mandrel and dies, and illustrating the improved method of simultaneously pressing the flutes and forming the column from a plain metallic sheet;

Figure 8 is a view similar to Fig. 7, showing the column completed and ready for removal;

Figures 9 and 10 are plan and side views respectively, of a sheet of malleable metal such as steel or alloy metal;

Figure 11 is an end elevation of a fluted tubular column as it appears after its removal from the fluting and forming mandrel;

Figure 13:
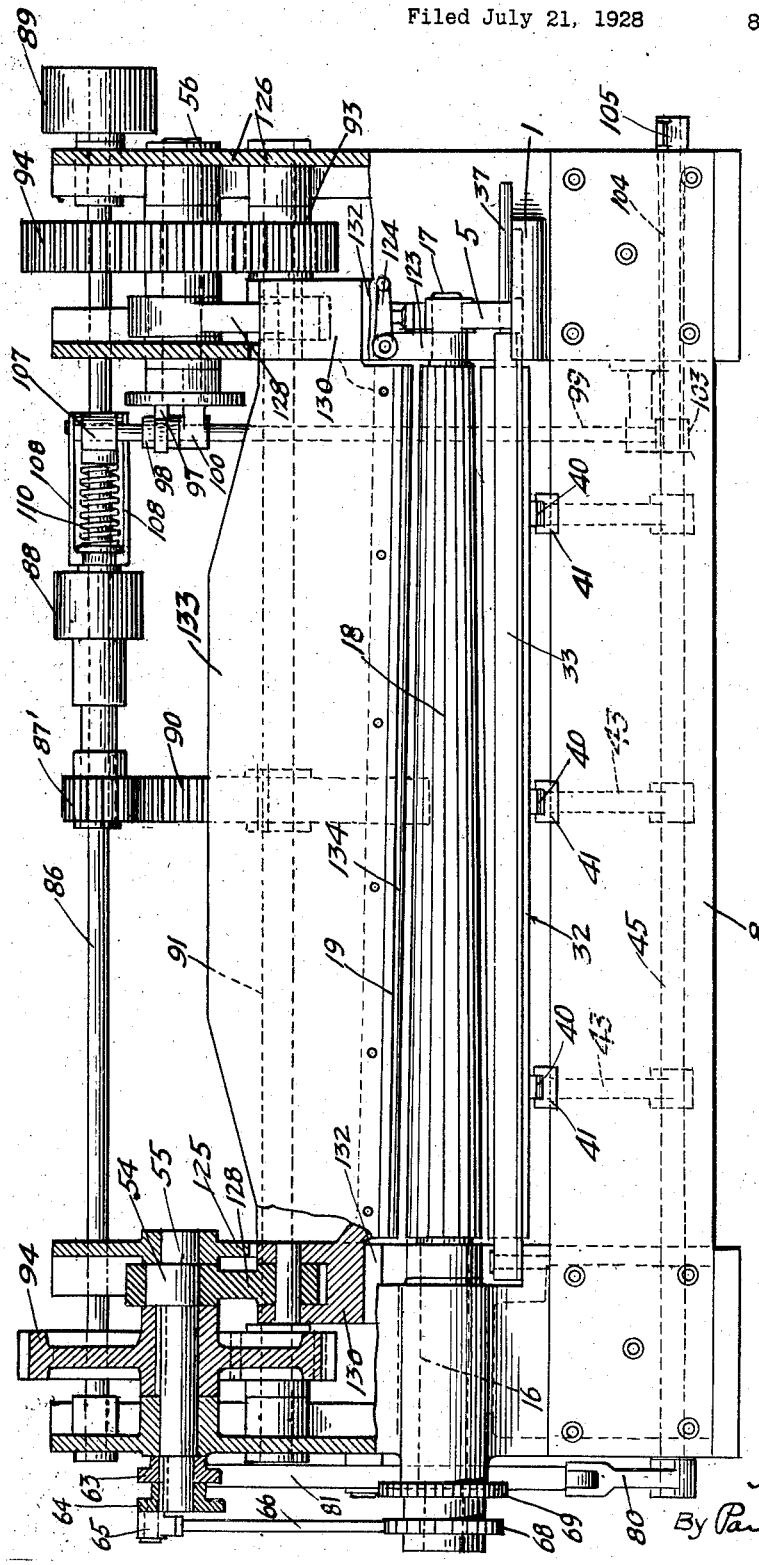

Figure 12 is a view showing an apparatus adapted for use in the final operation of completing a column which is a part of the process of manufacture, and consists in the compression of the fluted column to the required size, the closing of a predetermined gap or slot in its circumference, and the welding of the joint; and Figure 13 shows a modified arrangement of the frame of the machine, actuating mechanism, and indenting die bar.

Main frame

In the drawings, 2 represents the left-hand end frame of the machine in which one end of the mandrel is journaled in a bearing 3, and 4 represents the right-hand end frame which supports the removable bearing block 5, for supporting the opposite end of the mandrel. A series of intermediate frames 6 are interposed between the end frames 2 and 4, in numbers commensurate with the length and size of the columns to be made. All the frames are assembled upon, and rigidly secured to I-beam base members 7; and a vertical stress-resisting frame member 8 is secured between shoulders 9 and 10 of the main frames, which ties the frame members together and provides a rigid frame structure. The frames 2, 4 and 6 are of rigid construction capable of resisting, with safe factors of safety, the tensile and compression stresses required for forming the metal. The I-beam base members 7 are preferably imbedded in a suitable concrete foundation 12.

Forming mandrel and dies

Referring to Figs. 5 to 8, the main body 14 of the mandrel is preferably formed out of one piece of high carbon or manganese steel of sufficient length for the longest desired column and of the desired taper which the column or post is to take. It is provided at its largest end with the integral journal section 16, arranged in the bearing 3, and at the opposite and small end with the smaller journal 17, normally engaged in the bearing block 5. A series of longitudinal die bars 18 are preferably pressed into radial grooves provided in the periphery of the body 14 of the mandrel, and project some distance beyond its periphery. The number and form of the dies is determined by the number and size of the flutes required in the column. For reasons which will hereinafter appear, one more of these die bars is provided than the number of flutes required in the column. The indenting die bar 19 is supported slightly above the mandrel 14, upon jaw members 20 provided upon the rocker arms 15, and cooperate with the mandrel to complete one continuous flute in the material positioned upon the mandrel, for each cycle of operation. For reasons of structural and operative adjustments, the die bar 19 is preferably divided into a plurality of sections secured to the jaw members 20 by means of holding bars 21. The movements of the jaw members 20 are simultaneous and equal in extent, and these members therefore constitute in effect, a unitary structure.

The holding bar 21 is adjustably mounted upon the jaw members 20 for accurately aligning and spacing the die bar 19 with respect to the mandrel bars 18. Screws 22 and 23 and fastening bolts 24 provide means for thus aligning the bar 21. It will therefore be seen that the die bar 19 may be readily adjusted to the particular taper and diameter of the mandrel used for forming a certain size column. A rocker arm 15 is arranged in each section between the several frames, and each arm is mounted upon a short shaft 25, journalled in bearings 26 in the 2, 4, and 6 frames. The die bar 19 (see Figs. 7 and 8) is provided with longitudinal grooves 27 and 28, forming an outward bending projection 29 and the indenting members 30 and 31.

As it has been found impossible to provide sufficient rigidity of a mandrel for the forming of one flute at a time in columns of considerable lengths, due to the stress being exerted in one direction, a most important feature of the invention consists in providing automatically operated mandrel supports at various points of the mandrel to receive and transmit the induced stress to the frame of the machine. For this purpose, a movable mandrel-supporting bar 32 is arranged lineally with respect to the die bar 19 on the side of the mandrel diametrically opposite from the die bar 19. This support is parallel with the axis of the mandrel and is arranged for movement to and from the forming mandrel between two guide bars 33. The guide bars 33 are spaced apart forming a longitudinal slot adapted to receive the supporting bar 32, and are secured together at each end by spacing blocks 34 and 35. (See Fig. 6.) The block 34 is pivoted to the main frame 2 by a pin 36, and to the block 35 is attached a rod or handle 37 slidably passing through the movable bearing block 5, supporting the small end of the mandrel.

The mandrel-supporting bar 32 has a longitudinal groove 38, adapted to successively receive the beveled edges 39 of the die bars 18, thereby dually supporting the mandrel and locking it against rotation while a flute is being formed at the opposite side thereof. The under face of the bar 32 rests upon a series of tapered wedge bars 40, supported upon the upper inclined surfaces of blocks 41, arranged upon the rigid stress-resisting frame 8. The wedge bars 40 are connected by adjustable connections 42, to arms 43 mounted upon and secured to a longitudinal rocker shaft 45, journaled in bearings in the main frame members 2, 4, and 6. A spring 46 is attached to each arm 43 and tends to draw the wedge bars 40 forward to raise the supporting bar 32 against the forming mandrel to support it in the raised position upon the frame 8, until the wedge bars are forced back by operating mechanism hereinafter described.

Upon the frames 6 are secured brackets 47, vertically adjustable by screws 48 and slots 49, and having integral guide plates 50 projecting into slots 51 provided in the holding bars 21 and die bars 19, as shown in Figs. 1, 3 and 7. The guide plates 50 are provided with an indicating mark X and the curved under faces 52 of the guide plates 50, are formed to follow the circular contour of the mandrel, and are adjusted with a clearance above the upper edges of the mandrel bars 18 of substantially the thickness of the sheet metal of which the column is to be formed.

*Actuating mechanism*

The jaw members 20, carrying the die bar 19 are actuated by eccentrics 54, formed upon shafts 55, 56 and 57, and connected to the rocker arms 15 through eccentric straps 58 and pins 59. (See Figures 3 and 5.) The shafts 55, 56 and 57 are journalled in bearings 60 in the main frame members 2, 4 and 6, the ends of the shafts abutting at 61. The shaft 55 projects through the frame member 2 and to its outer end 62 are keyed cam disks 63 and 64. The journal 16 of the mandrel body 14 projects through its bearing in the frame member 2, and upon its protruding end 67 are rigidly secured a ratchet wheel 68 and a locking wheel 69. (See Figure 5.) A bifurcated crank arm 70 is mounted for movement upon the hubs of the ratchet wheel 68 and locking wheel 69, and is operatively connected to the crank pin 65 of the cam disk 64 by the connecting rod 66 and pin 67. The crank arm 70 carries a pawl 71 arranged to engage the teeth 73 of the ratchet wheel 68. The locking wheel 69 is provided with radial recesses or slots 74, into which is adapted to enter, a locking bolt 75, adjustably secured to a lever 76, pivoted to the frame member 2 at 77. The lever 76 carries on its lower end a roller 78, which is arranged to be engaged by the cam disk 64. A tension spring 79, connected to the lever 76 and frame 2, forcibly holds the locking bolt 75 in engagement with the locking wheel 69.

A crank arm 80 rigidly secured to the outer end of the rock-shaft 45, carrying the levers 43 for operating the mandrel supports. A depending arm 81 is pivoted upon the frame member 2 at 82, and carries a roller 83, engaging the cam disk 63. A rod 84 connects the lower end of this arm with the crank arm 80. When the high face of the cam disk 63 engages the roller 83, the supporting bar 32 will be moved out of engagement with the mandrel, as a result of the arms 43 being oscillated to move the wedge bars 40 to their retracted positions against the tension of the springs 46 during the periods when the mandrel is rotated. The following cutaway portion of the periphery of the cam 63 causes the shaft 45 to be rocked by the action of the springs 46, thereby forcing the wedge bars 40 forward and moving the supporting bar 32 upwards against the under side of the forming mandrel.

Driving and stopping mechanism

Referring to Figures 1 and 2, the main driving shaft 86, mounted in bearings 87, carries a driving pinion 87', a friction clutch 88 and a driving pulley 89. The pinion 87' meshes with a gear 90, secured to a shaft 91, journalled in bearings 92 and carrying a series of driving pinions 93. Each one of these pinions meshes with a gear 94 firmly secured to one of the eccentric shafts 55, 56 and 57. The shaft 56 carries a cam disk 96 (see Figs. 1, 4 and 5), having a segmental cam portion 97, adapted to be engaged by an arm 98 pinned fast to a vertical spindle 99 that is vertically slidable in brackets 100. A spring 101 normally holds the spindle in its lowest position against a stop collar 102, in which position the roller 95 of the arm 98 will be engaged by the cam 97. A lever 103 projects under the lower end of the spindle 99, and is, through a short shaft 104, rigidly connected to a foot lever 105. The upper end of the spindle 99 is provided with a feather key 106 and passes slidably through the hub of a forked clutch arm 107, embracing the driving shaft 86. Links 108 connect the clutch arm 107 with the movable clutch collar 109 of the clutch 88, and a spring 110 bearing against a collar 111, tends to force the clutch into operable position.

Any suitable type of clutch may be employed, and we have not, therefore, shown the clutch in detail. It may be stated, however, that the pinion 87 is secured to a sleeve (not shown), loosely mounted upon the shaft 86 and connected to the active stopping and starting member of the clutch 88. The construction of this machine in a series of short sectional units as shown in Figs. 1 to 8 and as hereinbefore described, while convenient for manufacture and of value by permitting an increased length of the machine and the production of greater length of columns, without undue weight and material in the operating parts for their necessary rigidity, is obviously not essential for the carrying out of the principle of the invention.

In Fig. 13 we have shown a unit type of machine of simpler construction, but equally within the scope of the main principles of the invention. The intermediate frame member 6 and the eccentric shaft 57 are here dispensed with, and for the end frames 2 and 4 are substituted the raised housings 125 and 126, in which are mounted the driving shafts. The eccentric shafts 55 and 56 are mounted in bearings in the housings 125 and 126 respectively. The rocker arms 15 and jaw members 20, holding the die bar 19, are dispensed with and the depending eccentric straps 128 are connected to cross heads 130, slidable between guide blocks 132. A single rigid beam 133 forms the support for the indenting die bar 134, and is rigidly connected at its ends to the cross heads 130. The driving, actuating and mandrel supporting mechanism are substantially unaltered from that heretofore described.

Operation of the machine

A sheet of metal A, cut to the required length and form from which the desired column or post will be made, is placed by the operator between the mandrel bars 18 and the die bar 19, its forward edge projecting under the guide plate 50 to the indicating mark X. At this time the parts are in the position shown in Figs. 2, 3 and 4, with the driving shaft 86 running idle, the clutch 88 being in neutral position and all actuating parts stationary. With the sheet A, in proper position, the operator depresses the foot lever 105, raising the cam arm 98 to the dotted position shown in Fig. 4, thereby disengaging the cam roller from the cam 97 and permitting the clutch spring 109 to move the stopping and starting member of the clutch 88 into operative engagement with the pinion 87 through the sleeve, not shown. Through the train of gears heretofore described, the eccentric shafts 55, 56 and 57 are rotated at compartively slow speed in the direction of the arrow in Fig. 2. At the first movement of the cam disk 63, its high cam face passes the cam roller 83 and permits the springs 45 to move forward the wedge bars 40 and raise the supporting bar 32 against the forming mandrel. Continued rotation of the eccentric shafts and crank disk 63, moves the pawl 72 backwards, idling over the ratchet teeth, the ratchet wheel 70 meanwhile being securely locked in place by the locking bolt 75, until, with slightly more than one half revolution of the crank wheel completed, its high face C engages the roller 78 and withdraws the locking bolt 75 from the recess 74 in the wheel 69. Slightly in advance of this time, the die bar 19 assumes the position shown in Fig. 8, indenting on one side of the uppermost bar 18, the first half of the flute B, and a second flute C in the sheet which has then assumed the position shown by the dotted line in Fig. 7. With the completion of one half revolution of the eccentric shafts, the further rotation of the mandrel will raise the die bar 19 out of contact with the sheet A, and the wedge bars 36 will be moved backwards by the high face of the cam disk 64 engaging the roller 83, permitting the supporting bar 32 to drop away from the forming mandrel. Following this operation, the pawl 72, on the backward swing of the crank arms 70, will engage a tooth 73 in the ratchet wheel and rotate the forming mandrel the space of one flute or channel. The parts are adjusted so that at the completion of the pawl stroke, the locking bolt 75 enters the succeding recess 74 of the locking wheel, securing the mandrel against movement during the next operation.

It will be understood that the teeth 73 in the ratchet wheel 70, the recesses 74 in the locking wheel 69, and the die bars 18 in the mandrel body 14, are equal in number and uniformly spaced. The guide plates 50 project beyond the center line of the mandrel and during the rotation of the mandrel, the leading edge of the sheet A is fed between the edges 52 and the uppermost die bar 18, and is then carried forward by this bar and passes under the curved faces 52 of the plates which keep the ridge of each flute in contact with the die bar 18, while the sheet A is being raised to the full line position in Fig. 7. If the foot lever 45 is held in a depressed position, the aforedescribed operation is repeated and at each descent of the die bar 19, the mandrel is moved forward a step, locked in position and the support applied. The fluted portion of the sheet is carried or wound around the mandrel during the ascending stroke of the die bar 19, and at the succeeding descending stroke, a new surface is presented to the die bar 19 and another channel or flute is indented in the sheet. This operation is continued automatically in rotation until the column has been completed, as shown in Fig. 8.

Upon the release of the foot lever 105, the spindle 99 and the cam arm 98 will drop; after which the cam 97 will engage the cam arm roller 95, and, by turning the spindle, will release the clutch 88 and interrupt the machine. Sufficient clearance spaces are provided between the die bar 19 and the body 14 of the mandrel, and the shapes of the die members 30 and 31 is adapted to transform the stress of fluting to a minimum of bending moments. To provide a uniform curve in the end portions B and D, the periphery of the mandrel is provided with elevated sections E, against which the opposite edges B and D of the sheet A are fulcrumed in the first and last forming operation of the column. It will be noted that during the making of the first half column, the supporting bar 32 will contact directly with the die bars 18 of the mandrel for its support, as in Fig. 7, but that, as the mandrel is rotated and the fluted sheet is wound around the mandrel, the ridges of the flutes formed over the die bars 18 will enter the groove 38 in the supporting bar and shorten the upward thrust of the bar, as in Fig. 8. This variation of movement is compensated for by the flexure and tension of the springs, which, during the forming periods, force and hold the bar firmly against the mandrel regardless of the absence of material on the bars 18 or the variations in the thickness of the material.

To prevent accidental overlapping of the ends B and D of the sheet A, during the final impression, and for the further purpose of providing means for the removal from the machine of the completed column, the forming mandrel is made of greater diameter than that required for the desired column. A gap 112 is thus left in the column which is closed by a subsequent operation of compression of the column to the required diameter before the welding of the joint.

Means are provided for the convenient removal of the fluted column from the mandrel as follows: A table 114 (see Figs. 4, 5 and 6) having guide ways 115 and 116, and a bracket 117 having a guide way 118, are secured to the end frame 4. (See Fig. 4). The bearing block 5, normally supporting the mandrel on the journal 17 is provided with a foot 120, fitting the lower guideway 115, and a head 121 fitting the upper guideway 118. In the bracket 117 is arranged an eccentric pin 122 upon which is supported a link or strap 123 embracing the journal 17 of the mandrel body 14. The longitudinal thickness of the strap 123 permits it to enter the gap 112 in the fluted column when the column is removed from the mandrel. When this is to be done, the eccentric pin is turned by means of its handle 124, which operation transfers the support of the mandrel from the bearing block 5 to the strap 123. The block 5 is then removed from the journal and its position in the guideways 115 and 118, and by means of the handle 37, moved in the guideway 116 to the position shown by dotted lines in Fig. 4 and full lines in Fig. 5. This movement swings the supporting bar 32 from beneath the smaller end of the mandrel, and provides room under the die bar 19 for the removal of the fluted column from the mandrel. After the column has been removed, the bearing block 5 is returned to its normal position on the journal 17 and its support of the mandrel restored by turning and lowering the eccentric pin 122.

In practice, the die bar 19 is adjusted by the screws 20, 22 and 24 with respect to the mandrel, so that when the fluting and forming of the column is completed, the column fits with a slight clearance around the mandrel to make it readily removable therefrom. After its removal from the mandrel, the column presents the form shown in Figure 11. Before the fluting and forming operation, the metal sheet A is cut to the required length, width and form, shown on a smaller scale in Figures 9 and 10. After the sheet such as shown in Figure 9, has been fluted and removed from the machine, it will assume the form shown in Figure 11 forming a column 135 whose diameter or circumference is larger than the size actually required, because of the gap or slot 112 separating the opposite edges B and D of the sheet A.

The column is then placed in a compressing apparatus, preferably comprising two or more frames 136, each having an upper concave surface 137 and provided with an arm 138, each having a concave surface 139. The arms 138 are mounted for rocking movement upon a shaft 141, and has a socket 140 provided at one end thereof adapted to receive a ball 144, terminally provided on a threaded rod 142, having a hand-wheel 143 on its upper end. The threaded rod 142 is mounted in an interiorly threaded housing 145 integrally formed with the frame 136. By turning the hand-wheel 143 in one direction, the arm 138 will swing to the open dotted line position shown in Figure 12.

When the partially completed column 135 is placed in the machine and engaged with the concave surfaces 137 and 139, the column 135 may be compressed to the predetermined diameter by rotation of the hand-wheel 143 and the threaded rod 142, thereby forcing the arms 138 to the position shown by full lines in Figure 12. The edges B and D will then join and are securely welded together the entire length of the column by blow torch or electric welding method. While this latter operation is being completed, another sheet of material may be passing through the fluting and forming machine in the manner heretofore described. It will therefore be noted that the complete operation of forming the whole sheet metal column consists first in fluting and forming the sheet material to the form shown in Figure 11, after which the partially completed column is placed in a machine shown in Figure 12, and its opposite edges B and D united and secured by such means as welding.

The construction of the compressing and welding apparatus here shown does not form the subject matter of this application, but has been shown and described as a necessary element in the complete procedure and method of fastening together the edges B and D of the partially completed column or post 135 shown in Figure 11, which we, together with the fluting and forming machine here shown and described, believe to be novel and desire to secure by Letters Patent.

While the foregoing describes the exact construction of the fluting and forming machine, obviously various changes and modifications may be made in the construction without departing from the principle and scope of the invention. It is evident for example, that instead of the sliding wedge bars 40 for the intermediate support of the mandrel, rotatable eccentrics or cams might be substituted with substantially equal result, and we do not therefore wish to limit the claims to the exact form of construction shown and described.

Having thus described our invention, what we claim as new and desire to secure by Letters Patent is:—

1. A fluting and forming machine comprising a rotatable mandrel having longitudinally disposed die ribs, a movable die bar arranged adjacent to the mandrel and between which and said mandrel the sheet of material to be formed may be fed, means cooperating with the die bar for forming flutes in the sheet as it passes between the die bar and the mandrel, actuating mechanism for periodically rotating the mandrel after a flute has been formed, and means cooperating with the mandrel and said mechanism for retaining a fluted portion of the sheet in engagement with the mandrel as the latter is rotated.

2. A fluting and forming machine comprising a main frame, a rotatable mandrel mounted in said frame and having longitudinally disposed die ribs, a movable die bar arranged adjacent to the mandrel and between which and said mandrel the sheet of material to be formed may be fed, means cooperating with the die bar and the mandrel for forming flutes in the sheet, means for rotating the mandrel and winding the fluted portion of the sheet upon the mandrel progressively to form a tubular column, a constricted support for one end of the mandrel connected to the main frame, and means for removing the column from the mandrel including a longitudinal gap in said column through which the restricted support is passed when the column is removed from the mandrel.

3. A machine of the class described, comprising a main frame, a mandrel rotatably mounted in said frame and having longitudinally disposed die ribs, a die bar arranged adjacent to the mandrel and movably mounted in the main frame, a stress-resisting member arranged intermediate the ends of the mandrel and on the side of the mandrel opposite the die bar, means cooperating with the die bar and the mandrel for periodically making channels in a malleable sheet introduced between the mandrel and the die bar, and means for intermittently interposing a supporting medium between said mandrel and said stress-resisting member.

4. A machine of the class described, comprising a main frame, a mandrel rotatably mounted in said frame and having longitudinally disposed die ribs, means including a movable die member adapted to indent flutes between said die ribs in a malleable sheet introduced between the mandrel and said movable die member, a stress-resisting member arranged intermediate the ends of the mandrel and on the side of said mandrel opposite said movable die member, means for intermittently rotating the mandrel and winding the fluted portion of the sheet around said mandrel, means for intermittently interposing a supporting member between said stress-resisting member and the mandrel, means cooperating with the supporting member for periodically forcing said member against the die ribs of the mandrel, and space compensating means for forcing said supporting member against the fluted sheet when covering the die ribs, and thereby supporting the mandrel upon the stress-resisting member through the said fluted sheet.

5. In a machine of the class described, the combination with a frame and a mandrel rotatably mounted in said frame and having longitudinally disposed and radially projecting die ribs, of a stress-resisting frame member, arranged between the ends of and adjacent to the mandrel, an intermediate supporting element arranged between the mandrel and the stress-resisting member, a slotted member secured to the frame and in which the said supporting element is disposed and adapted to move to and from the mandrel, movable means interposed between said supporting element and the stress-resisting frame member for moving said supporting element against the die ribs of the mandrel and thereby supporting the mandrel upon the stress-resisting frame member, and interlocking means arranged upon said supporting element and coacting with said die ribs for rigidly holding the mandrel against rotation.

6. In a machine of the class described, the combination of a frame, a rotatable mandrel journalled in said frame and having longitudinally disposed and radially projecting die ribs, means for indenting flutes between said die ribs in a malleable sheet introduced over the mandrel, actuating means for rotating the mandrel and progressively winding the fluted portion of the sheet upon and around the mandrel to form a hollow column, a stress-resisting frame member arranged between the ends of and adjacent to the mandrel, an intermediate supporting element arranged between the mandrel and the stress-resisting frame member, a slotted member in which said supporting element is disposed and adapted to move to and from the mandrel, means including slotted supports for a journal of the mandrel and for securing said slotted member and the intermediate supporting element in place adjacent to the mandrel and whereby said element and member may also be moved laterally away from the mandrel.

7. In a fluting and forming machine, the combination with a rotatable mandrel and a main frame in which one end of said mandrel is journalled, of a movable journal box normally supporting the opposite end of the mandrel, an auxiliary journal support connected to the main frame and adapted to support the opposite end of the mandrel, and adjustable means including an eccentric for transferring the support of the mandrel from the movable journal box to the auxiliary journal support.

8. In a fluting and forming machine, the combination of a main frame, a forming mandrel rotatably mounted in said frame, said mandrel having longitudinally disposed and radially projecting die ribs, a die member movably mounted upon the main frame and adapted to impress flutes in a plain malleable sheet as said sheet passes between the mandrel and said die member, actuating means for moving said die member relative to the mandrel, and means adapted to thereafter rotate the mandrel to feed the sheet a predetermined distance between said die member and mandrel.

9. In a fluting and forming machine, the combination of a main frame, a forming mandrel rotatably mounted in said frame, said mandrel having longitudinally disposed radially projecting die ribs, a die member movably mounted upon the main frame and adapted to impress flutes in a plain malleable sheet as said sheet is passed between the mandrel and said die member, means for moving said die member relative to the mandrel, actuating means adapted to thereafter rotate the mandrel to feed said sheet a predetermined distance between said die member and mandrel, and means including a concaved plate for guiding the fluted portion of the sheet upon and around the mandrel.

10. In a machine of the class described, a mandrel, a supporting means therefor comprising a main frame having bearings for each end of the mandrel, a stress-resisting frame member arranged between the end bearings of the mandrel, an intermediate element movably arranged between the mandrel and the stress-resisting frame member, and means for periodically thrusting said intermediate element against the mandrel and supporting said mandrel upon the stress-resisting frame member.

11. In a machine of the class described, a mandrel supporting means comprising a main frame having a bearing for each end of the mandrel, a stress-resisting frame member arranged between the end bearings of the mandrel, an intermediate element movably arranged between the mandrel and the stress-resisting frame member, a variable space-filling wedge member interposed between said intermediate element and the stress-resisting frame members, and means for periodically thrusting said wedge members between said intermediate element and said frame member, to support the intermediate portion of said mandrel upon the stress-resisting frame member.

12. In a machine of the class described, a mandrel, a supporting means therefor comprising a main frame having a bearing for supporting each end of the mandrel, a stress-resisting frame member arranged between said end supports, an intermediate bar mounted for movement to and from the mandrel and arranged between the mandrel and the stress-resisting frame member, a guide member in which said intermediate bar is adapted to move, interlocking means between the guide member and the main frame, and connections between said guide member and said frame permitting lateral movement of said member and intermediate bar away from the mandrel.

13. In a machine of the class described, a mandrel, a supporting means therefor comprising a main frame upon which the mandrel is supported at its ends, a stress-resisting frame member arranged between the end supports of the mandrel, stress-transmitting elements arranged between the mandrel and the stress-resisting frame member including a wedge and a spring under tension adapted to force said wedge between the mandrel and the stress-resisting member, and means including a cam for periodically releasing said spring to force said wedge between the mandrel and the stress-resisting member to support the intermediate portion of the mandrel thereon.

14. In a machine of the class described, a mandrel, a supporting and locking means therefor comprising a main frame upon which the mandrel is supported at its ends, a stress-resisting frame member arranged between the end supports of the mandrel, actuating means, movably mounted upon the main frame for periodically forming a flute in a malleable sheet introduced between said actuating means and the mandrel, and means for periodically thrusting a supporting and locking element against the mandrel to lock said mandrel against rotation and to support it upon the stress-resisting member while said flute is being formed.

15. A machine for forming fluted columns from sheet material, comprising a mandrel having longitudinally disposed spaced-apart ribs in its periphery, a die member having a longitudinally extending groove adapted to receive one of said ribs, and between which and said mandrel the material to be formed is fed, means for operating said die member, and means causing the fluted portion of the sheet to be wound around said mandrel as the latter is rotated.

16. A machine for forming fluted columns from sheet material, comprising a mandrel having spaced-apart longitudinal ribs in its periphery, a die member having a longitudinally extending groove adapted to receive said ribs one at a time as the mandrel is rotated, and means causing the fluted portion of the sheet to be held in engagement with the ribs on said mandrel whereby said ribs will cause the sheet to be fed between the mandrel and die member.

17. In a machine of the class described, the combination of a mandrel having a support at each end thereof, a die member cooperable with said mandrel to form flutes in a sheet of material fed therebetween, means for periodically actuating said mandrel, a stress-resisting member situated between said supports, and means adapted to be interposed between said mandrel and said stress-resisting member adapted to provide a support for an intermediate portion of the mandrel each time the latter is at rest and said die member is actuated.

18. A machine for forming fluted columns from sheet material, comprising a mandrel having longitudinally disposed spaced-apart ribs in its periphery, a die member having a longitudinally extending depending portion adapted to be received between adjacent ribs and between which and said mandrel the material to be formed is fed, means for operating said die member, and means for causing the fluted portion of the sheet to be wound around said mandrel when the latter is rotated.

19. A machine for forming fluted columns from sheet material, comprising a mandrel having longitudinally disposed spaced ribs in its periphery defining longitudinal channels, a die member having a portion adapted to be successively received in said channels and cooperating with said ribs to form flutes in the material fed between the mandrel and said die member, and means causing the fluted portion of the sheet to be held in engagement with ribs on said mandrel.

20. A machine for forming fluted columns from sheet material, comprising a mandrel having longitudinally disposed spaced ribs in its periphery defining longitudinal channels, a die member having an elongated portion adapted to be successively received in said channels and cooperating with said ribs to form flutes in the material fed between said mandrel and said die member, and means causing the fluted portion of the sheet to be held in engagement with ribs on said mandrel when the latter is rotated.

In witness whereof, we have hereunto set our hands this 18th day of July, 1928.

JAMES JESSEN.
JAMES P. MARRIN.